INVENTORS
BENEDICT E. MEULEMANS
WILLIAM H. PAULY
BY R. G. Story
ATTORNEY

Oct. 31, 1961  B. E. MEULEMANS ET AL  3,006,769
MANUFACTURE OF CHEESE SLABS OR THE LIKE
Filed Aug. 26, 1954  5 Sheets-Sheet 4
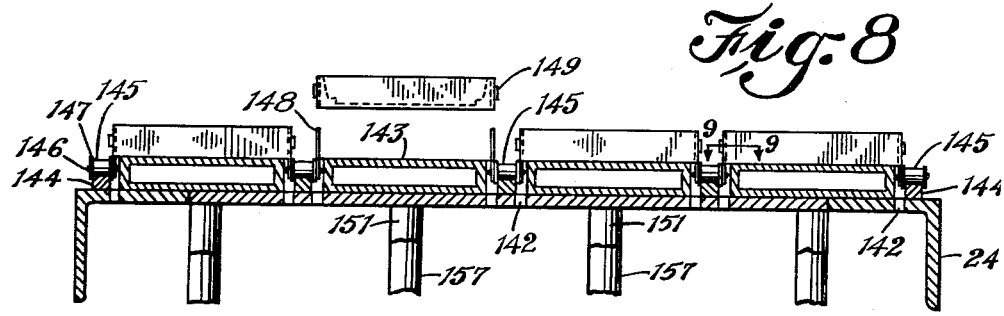
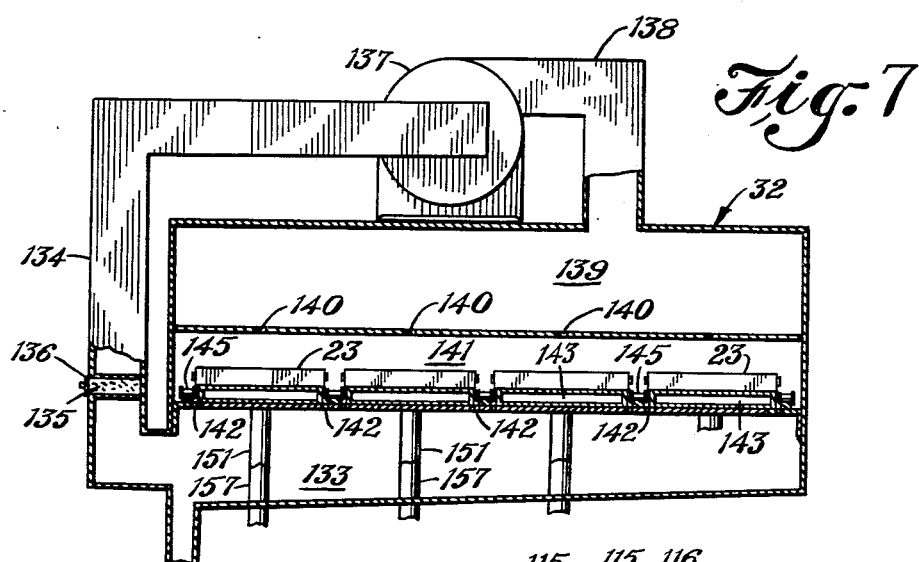
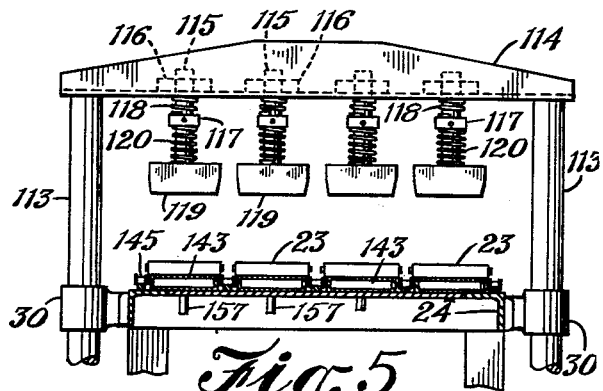
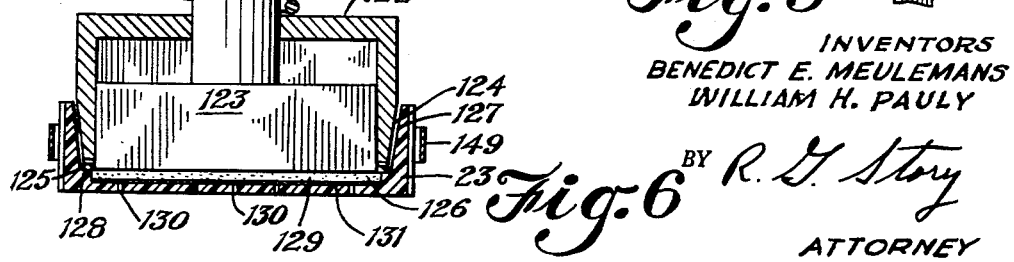
INVENTORS
BENEDICT E. MEULEMANS
WILLIAM H. PAULY
BY R. G. Story
ATTORNEY Oct. 31, 1961 B. E. MEULEMANS ET AL 3,006,769
MANUFACTURE OF CHEESE SLABS OR THE LIKE
Filed Aug. 26, 1954 5 Sheets-Sheet 5

INVENTORS
BENEDICT E. MEULEMANS
WILLIAM H. PAULY

BY R. G. Story

ATTORNEY

United States Patent Office 3,006,769
Patented Oct. 31, 1961

3,006,769
MANUFACTURE OF CHEESE SLABS OR THE LIKE

Benedict E. Meulemans and William H. Pauly, Green Bay, Wis., assignors to Swift & Company, Chicago, Ill., a corporation of Illinois
Filed Aug. 26, 1954, Ser. No. 452,260
5 Claims. (Cl. 99—116)

The present invention relates to a method for molding slabs of a plastic material on sheets of a parting material and for grouping the molded slabs.

The invention is particularly adaptable for forming stacks of slabs of process cheese, sometimes referred to herein merely by the term "cheese," having a sheet of parting material between each pair of slabs and the embodiment discussed herein was devised for the handling of process cheese. One of the problems that is encountered in attempting to cast the slabs one at a time is to obtain a uniformity not only in amount of product in each slab but also to obtain a uniformity in appearance of the slabs. If the slabs are of varying thickness, for example, the purchaser, or prospective purchaser, is likely to conclude that the quantities present are less than is expected even though the total weight of the package is as declared. In addition, the appearance of the package will be less desirable than in the case where all slabs are identical. The principal object of the present invention is to provide a method whereby a group of uniform, cast, slabs is assembled with a sheet of a divider material between adjacent slabs.

The method by which this is achieved is to cast each slab individually on a sheet of divider material. The measured amount of the plastic material to be cast into a slab is cooled and then flowed under pressure into the specific predetermined shape for the slab. The individual slabs are then further cooled and assembled into groups. This method for achieving the principal object of the invention results in a number of distinct advantages, which include: there is little or no loss from re-work, i.e., cheese from which salable slabs are not made and which suffers a loss in value in salvaging plus the additional cost of salvage operations; the relatively quick solidification of the slabs because of the increased area for contacts by cool surfaces in relation to the mass of the slab; and the mounting of each slab on a sheet of divider material which at all times gives it support and protection against tearing or similar damage until the slab is to be used, at which time the divider material is stripped off.

Another object of the invention is the provision of an automatic operation during which the product does not come into contact with human hands. This permits a more sanitary operation and lowers the cost of the resulting product as compared with the cost resulting from the use of conventional methods.

In addition, at times there may be some spillage or splattering as a result of some accident that will dirty the molds and require cleaning. As mentioned, the minimizing of such cleaning is an object and various portions of the apparatus were devised with the view of achieving this object. For example, antidrip valves are employed at the end of the mold filling spouts. In addition, each mold is an individual unit and not only can be removed but can be removed merely by lifting it off the machine by one hand. The molds are replaced by pressing them back in place. Thus, in a relatively few minutes an employee can remove all the molds and put them in a suitable washing machine for cleaning. While they are washing he can wipe and perform any other service operations on the machine. When these two jobs are completed, it is then only a few more minutes until all the molds are pressed back in place. The use of some extra molds prevents any long shutdowns for cleaning in the event of any accidents during the day, as any damaged, clogged, or dirtied molds may be removed and clean molds substituted without holding up the operations for repair or cleaning.

Another object and feature of the invention lies in the method by which the tamper mechanism causes the plastic cheese to flow into the desired shape and, when used in conjunction with a mold, closes the mold and then applies pressure to the plastic cheese to cause it to fill the mold to form a slab of the desired dimensions. A closely related object and feature lies in the provisions for venting the mold both during the pressing and the ejection operations. This is accomplished in a unique manner that prevents the vents from being blocked or fouled by the cheese.

The present invention will be described in conjunction with the formation of groups of interleaved cheese slabs. It should be understood, however, that the method of the present invention is suitable for use in conjunction with any plastic material similar in physical characteristics to process cheese.

In the drawings:

FIGURE 5 is a sectional elevation of the tamping or pressure supplying mechanism viewed along line 5—5 in FIGURE 1.

FIGURE 6 is a sectional detail of a single tamping device shown in FIGURE 5, pressed into place in a mold.

FIGURE 7 is a partial section of the chill tunnel taken along line 7—7 of FIGURE 2.

FIGURE 8 is a section of the conveying means taken along line 8—8 of FIGURE 1 with one of the molds released from the conveyor.

Figure 1:
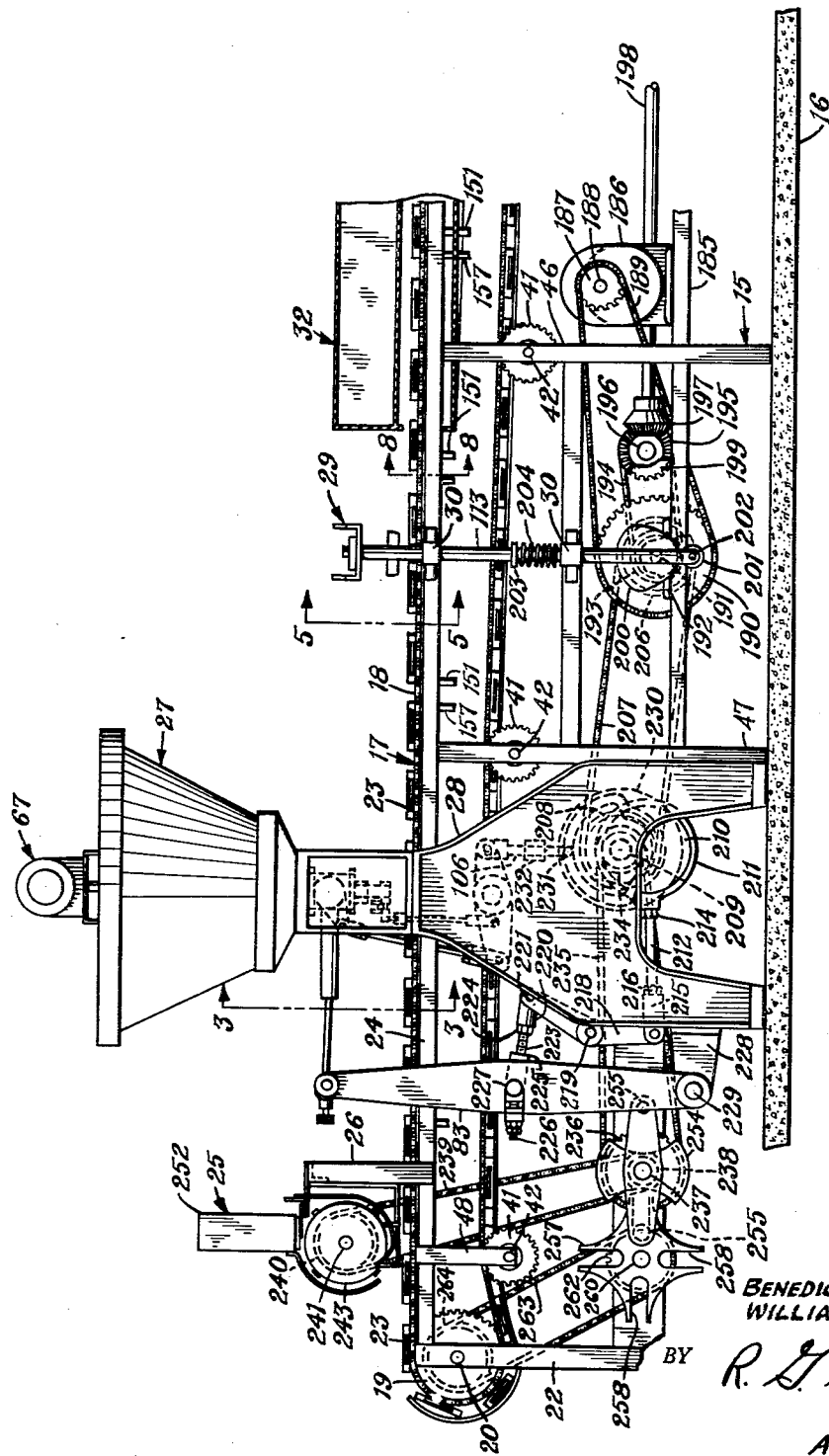
FIGURE 1 is a side elevation of a portion of an embodiment of an apparatus for carrying out the present method showing some of the parts in section.

In FIGURE 1, a portion of the apparatus is shown which includes a frame generally 15 mounted on a base 16 such as flooring, etc. On the frame 15 is a conveyor generally 17 which comprises at least two chains 18 mounted on sprockets 19. Sprockets 19 are mounted on the shaft 20 which is journaled in the vertical member 22 of frame 15. Molds 23 form a part of conveyor 17 which is supported during a portion of its travel by the horizontal frame member 24. An interleaving material feeder generally 25 is mounted on the horizontal frame member 24 by means of the vertical member 26. This paper divider feeder is of conventional design and of the type shown in Patent No. 2,558,028. Mounted on the frame and at a point removed from the paper feeder 25 is a filler generally 27. The filler is supported by members 28 which form a part of the general frame 15. The various parts of the filler 27 will be fully described in conjunction with FIGURES 3 and 4.

Mounted on the frame 15 at a point removed from the filler 27 is a pressure or tamping device generally 29 which is supported on frame 15 by bearings 30. The tamping device 29 will be further described in connection with FIGURES 5 and 6. Still further along the frame 15 is mounted a chill tunnel generally 32, a portion of which is shown in FIGURE 1. The remainder of the chill tunnel 32 is shown in FIGURE 2.

Figure 2:
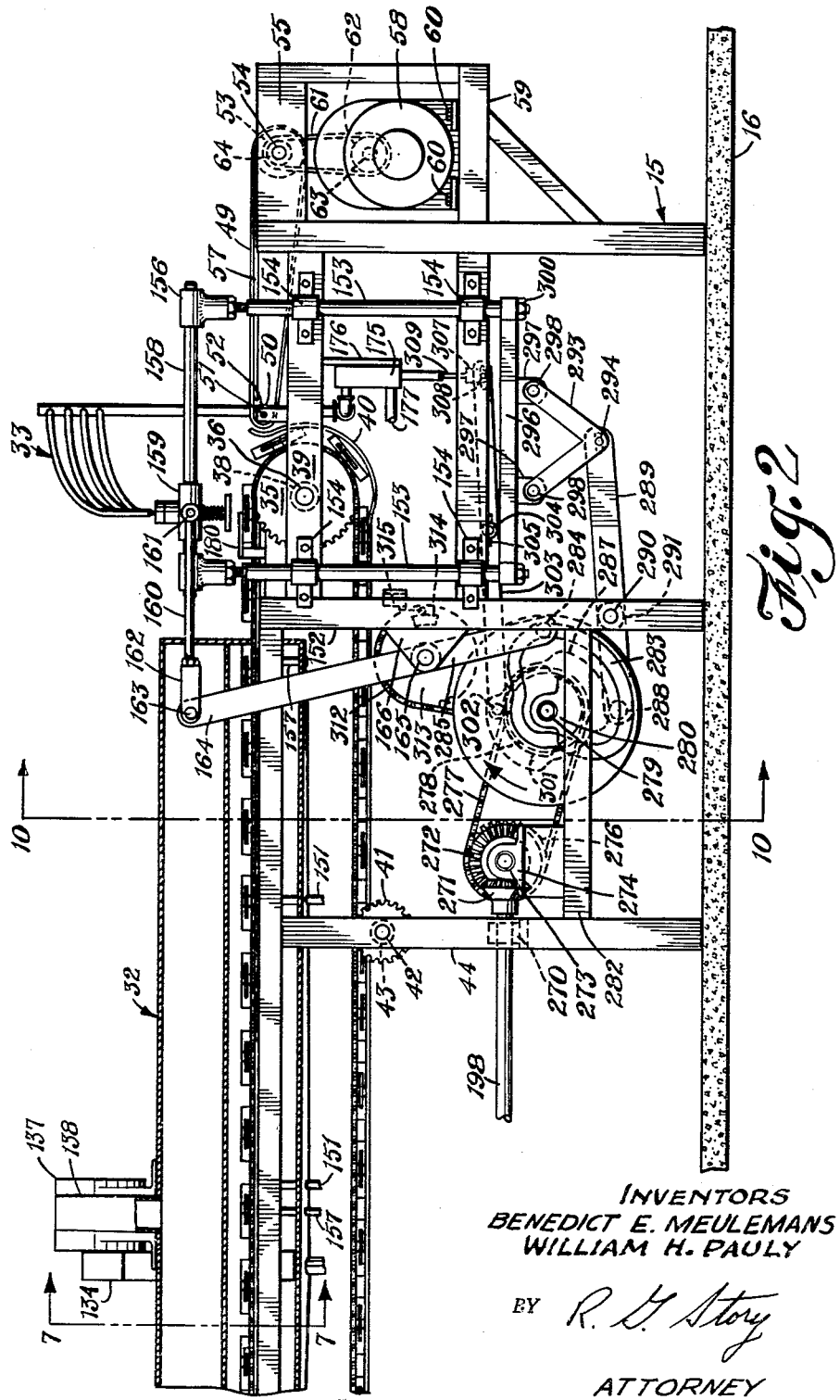
FIGURE 2 is a side elevation of the remainder of the apparatus shown in FIGURE 1, drawn on a slightly larger scale for purposes of clarification. Portions of this view are also in section.

Referring to FIGURE 2, near the end of the conveyor 17 a transfer mechanism generally 33 is shown mounted on the frame 15. This transfer mechanism will be more clearly described in conjunction with FIGURES 10, 11 12. The conveyor 17 is supported at its remaining end by sprockets 35 as shown in FIGURE 2 which are mounted on shaft 36 which, in turn, is journaled in bearings 38 mounted on horizontal frame members 39.

As illustrated in FIGURES 1 and 2, during the return portion of the travel of conveyor 17 the molds 23 are supported by the mold support 40. Additional support of the conveyor is supplied by sprockets 41 shown in FIGURES 1 and 2 which are mounted on shafts 42 which, in turn, are journaled in the bearings 43, mounted on the vertical frame members 44, 46, 47, and 48.

Continuing with FIGURE 2, near the end of frame 15 is a stacking conveyor belt which passes around a pulley 50 mounted on shaft 51 journaled in the vertical frame member 52. An additional pulley 53 supports the other end of the conveyor belt 49 and is mounted on shaft 54 which in turn is journaled in the horizontal frame member 55. A support plate 57 is also mounted on the frame to supply support to the belt 49 between pulleys 50 and 53. The driving means for the conveyor 49 comprises a gear motor 58 mounted on a horizontal frame member 59 and attached thereto by bolts 60. Extending from the gear motor 58 is a driving belt 61 driven by pulley 62 mounted on the driving shaft 63. The driving belt 61 is associated at its other end with a pulley 64 mounted on shaft 54.

Figure 3:
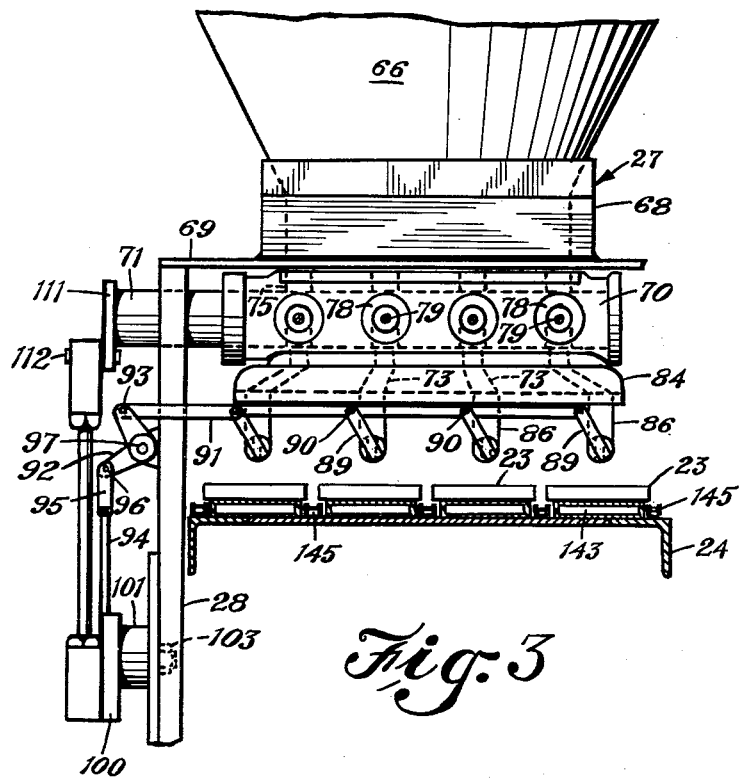
FIGURE 3 is a partial section taken along line 3—3 of FIGURE 1 showing the filling apparatus.
Figure 4:
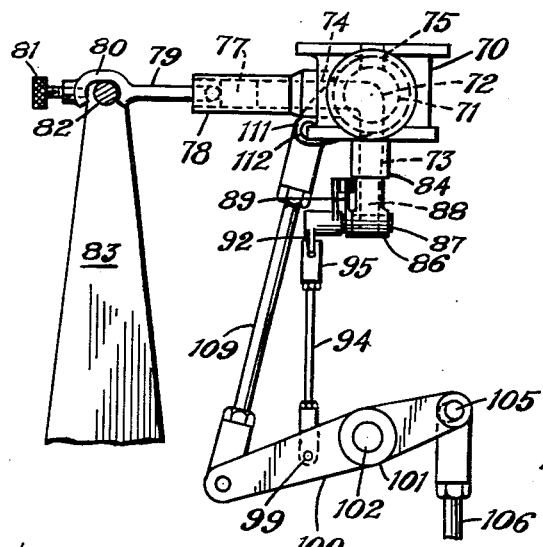
FIGURE 4 is a detail of the valve arrangement of the filling device shown in FIGURE 3.

Referring to FIGURE 3, the feeding mechanism 27 is shown in greater detail. The mechanism generally consists of a hopper 66 having positioned therein an agitator generally 67 (see FIG. 1) and being partially enclosed at the bottom thereof by a V-shaped portion 68. A hopper support 69 forms a part of the filler support 28. Directly below the V-shaped bottom portion 68 of hopper 66 is a valve housing 70 supported by valve core 71 which in turn is journaled in the support members 28. Referring to FIGURE 4, right angle passageways 72 form a part of the valve core 71 and communicate with passageways 73, 74, and 75. A piston 77 is mounted in the cylinder 78 and is attached to a piston rod 79 being formed at one end thereof with a yoke 80. The yoke contains an adjusting screw 81 and is mounted around a rod 82 which in turn is attached to a pivot arm 83.

The numeral 84 indicates a housing attached to the valve housing 70 and embodying passageways 73. The housing 84 contains stopcock valve fittings 86 which include valve cores 87 and passageways 88. The valve cores 87 are operated by valve core arms 89. Referring to FIGURE 3, the valve core arms 89 are attached to a reciprocating arm 91 by means of pins 90. The reciprocating arm 91 is connected to a lever 92 by pin 93. The lever 92 is in turn operatively attached to rod 94 through a clevis 95 which is secured to the lever 92 by pin 96. Lever 92 is pivotally supported from frame 15 by a pin 97. Referring back to FIGURE 4, rod 94 has a rod end attached thereto which is in turn connected to a rocker arm 100 by means of pin 99. The rocker arm 100 includes a hub 101 in which is journaled a shaft 102 attached to frame member 28 (see FIGURE 3) by a nut 103. A pin 105 connects one end of the rocker arm 100 to a rod 106. To the other end of the rocker arm 100 is attached a rod 109, the other end of which is pinned to operating arm 111 by means of pin 112. As can be seen in FIGURE 3, the operating arm 111 is fixed to the valve core 71.

In FIGURE 5 a more detailed view of the pressure or tamping device 29 is shown. This device includes moveable guide rods 113 connected by a channel beam 114 in which are mounted tamper rods 115 held at one end to the channel beam 114 by nuts 116. The tamper rods 115 have positioned thereon adjustment collars 117 against which one end of each of springs 118 bears. The other end of each spring 118 contacts the bottom surface of the channel beam 114. The numeral 119 generally designates individual tamper heads. Springs 120 are positioned between the tamper heads 119 and the adjustment collars 117.

Referring to FIGURE 6, each tamper head 119 includes a tamper housing 122, having an opening in the upper portion thereof through which the rod 115 moves. At the lower end of the rod there is attached an individual tamper 123 which fits closely to the inner surfaces of the walls of the tamper housing 122. The outer surfaces of the walls of tamper housing 122 are tapered as indicated at 124. Near the lower surface of these walls there are small breather openings 125. A substantial portion of the inner surface walls of molds 23 are slanted as shown at 127 to match the taper of the walls of the tamper housing 122. The inner bottom portion of each mold contains a recessed area 126 which forms the space in which process cheese 129 is molded into a slab. The upper limit of the molding space 126 is defined by a shelf or ledge 128. Through the bottom wall of the mold are breather openings 130 which communicate with molding space 126. The interleaving material 131 covers the bottom of the mold and lies below the cheese 129.

Referring to FIGURE 7, a partial section of the chill tunnel 32 is shown in combination with the conveyor 17 passing therethrough. Conduit 134 extends from a lower chamber 133 to the intake of blower 137. In the conduit is an access door 136 for the insertion and removal of a filter 135. From the blower 137, conduit 138 extends into a pressure chamber 139. The pressure chamber 139 contains perforations 140 along its lower wall to allow communication between the pressure chamber 139 and the chilling chamber 141. To complete the circulation a plurality of openings 142 in the common wall between the chilling chamber 141 and the lower chamber 133 allow the air to recirculate throughout the system.

In FIGURE 8, a cross sectional view of the conveyor 17 and its supporting parts on horizontal frame member 24 are shown. Supported on frame member 24 are hollow cooling plates 143. In addition to these hollow cooling plates, tracks 144 are positioned on the frame member 24 to support and guide rollers 145 which form a part of the chains 18. The pins 146 hold the sidebars 147 to the rollers 145. Every fifth sidebar, depending upon the pitch of the chain and the exact size of the molds, has a finger 148 which cooperates with spring clips 149 mounted on the sides of the molds 23 for the purpose of attaching the molds to the conveyor.

As can be seen in FIGURE 8, the hollow cooling plates 143 contain inlets 151 and outlets 157 for the transferring of coolant therethrough. Also in FIGURE 1 it can be seen that the cooling plates 143 are formed into sections, each section having its separate inlet and outlet. The sectionalizing of the cooling plates, however, is not necessary as it is possible to utilize a continuous hollow rectangular conduit under each line of molds having a single inlet and outlet for coolant. Preferably, the coolant is flowed countercurrently to the direction of travel of the molds. This allows a greater reduction in the temperature of the cheese during its passage through the chill tunnel 32 and a sufficient reduction in temperature immediately after the filling of the molds and prior to the tamping operation. This latter reduction in temperature is desirable as the cheese is less apt to adhere to the face of the tampers 123 during the tamping operation.

Figure 9:
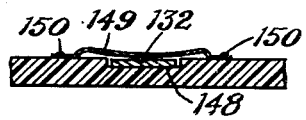
FIGURE 9 is a detail section of the mold clamping means taken along line 9—9 of FIGURE 8, which view has been rotated 90° clockwise.

With respect to the attachment of the molds to the conveyor, reference is made to FIGURE 9 wherein a cross section of one side of a mold 23 is shown having a recessed portion into which the finger 148 is inserted and held in the place by spring clip 149 attached to the outer surface of the wall of the mold by pins 150. A conventional type of detent locking arrangement 132 aids in retaining the mold in place on the conveyor.

Figure 10:
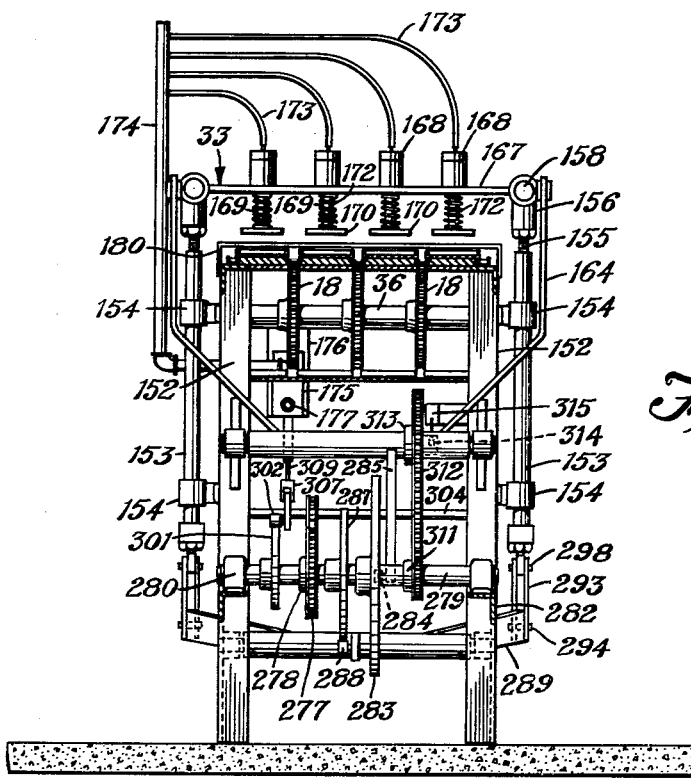
FIGURE 10 is a partial sectional view taken along line 10—10 of FIGURE 2 showing in particular an elevation of the transfer mechanism.

The transfer mechanism can be described with reference to FIGURES 10, 11, and 12. In the view shown in FIGURE 10, vertical frame members 152 support the transfer mechanism by means of elevating rods 153 which are journaled in the bearings 154. Adjusting rods 155 are attached at the upper end of elevating rods 153. Mounted on the other end of the adjusting rods 155 are the adjusting T's 156, which are more clearly shown in FIGURE 2. Referring in particular to FIGURE 2, a rod 158 extends between the pairs of adjusting T's 156. A similar rod 158 extends between the pair of adjusting T's 156 on the other side of the machine but such is not shown. A sleeve 159 is slideably mounted on each of rods 158. Connecting rods 160 are attached to each of sleeves 159 by means of pins 161. Connected to the other end of each rod 160 are clevises 162 which in turn are pivotally attached to a rocker arm 164 by means of pin 163. Each rocker arm 164 is fixedly mounted to shaft 165 (more clearly seen in FIGURE 10), this shaft being mounted in bearings 166. The parts above described in connection with FIGURE 2 are duplicated on each side of the machine as can be seen with reference to FIGURE 10.

Referring back to FIGURE 10, a plate 167 extends between the two sleeves 159 to support the individual transfer units. These transfer units comprise rod housings 168 into which are inserted hollow rods 169 which in turn have vacuum plate housings 170 fixedly mounted thereto. Springs 172 surround each rod 169 between plate 167 and housing 170. Extending from the rod housings 168 are the vacuum hoses 173 which are attached to a vacuum line 174. Referring back to FIGURE 2, air valve 175 is attached to the vacuum line 174 and is mounted to the frame 15 by means of plate 176. An additional vacuum line 177 extends from the lower portion of the air valve 175.

Figure 11:
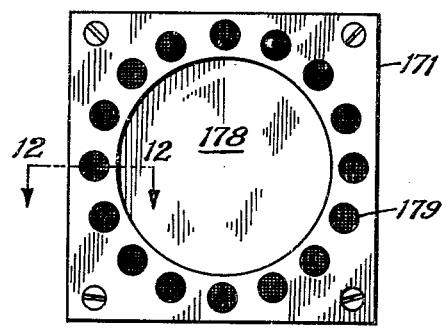
FIGURE 11 is a view of the face of a single transfer element.

Referring to FIGURE 11, the face of a vacuum plate housing 170 is shown and is designated by numeral 171. This face contains a central recess 178 which can be more clearly seen in connection with FIGURE 12. Around recess 178 are a plurality of openings 179. The vacuum plate housing includes a chamber 182 which contains a plurality of passageways 184 in which screens 183 are placed and which communicate with openings 179. One of such screened passageways is shown in FIGURE 12.

In describing the driving mechanism, the operation of the apparatus will also be described. Referring to FIGURE 1, mounted on a horizontal frame member 185 is a gear motor 186 which drives a sprocket 187 secured to output shaft 188 of the gear motor. A chain 189 is driven by sprocket 187 to transfer power to sprocket 190 which in turn is mounted on shaft 191 journaled in bearings 192. Also mounted on shaft 191 is a sprocket 193 which drives chain 194 which, at the other end thereof, drives a sprocket 199. A miter gear 195 is attached to the miter gear shaft 196 as is sprocket 199, and transmits power to the second miter gear 197. The latter gear is mounted on shaft 198 which transmits power to the portion of the apparatus shown in FIGURE 2, such operation to be subsequently described.

A cam 200 is mounted on the shaft 191. Associated with cam 200 is a cam follower 201 mounted on shaft 202, the latter being connected to one of the guide rods 113. These parts are duplicated on shaft 191 to operate the other guide rod 113 shown in FIGURE 5. Springs 204 are mounted on guide rods 113 so as to abut the fixed collars 203 and the top surfaces of the bearings 30. One of such assemblies is shown in FIGURE 1. As the shaft 191 rotates, the cam 200 rotates and acts upon the cam follower 201 to lower the guide rods 113 and thereby bring the tamping mechanism into contact with the molds. The guide rods 113 are raised by springs 204 when the cam releases the cam follower.

Also, fixedly mounted on shaft 191 is a sprocket 206 which drives a chain 207 which in turn extends to operate a sprocket 208 mounted on a shaft 209. By means of this arrangement, the power transmitted to shaft 191 by the gear motor is transmitted to shaft 209. Mounted on shaft 209 is an eccentric 210 which is inserted in the eccentric strap 211. Strap 211 is in turn threaded on the end of a rod 212 and fixed into place by locking nut 214. A clevis 215 on rod 212 is fixed by a locking nut 216. This clevis is pinned to a rocker arm 218 attached to the frame 15 by a shaft 219. At the other end of the rocker arm 218 is attached a rod end 220 by pin 221. This rod end 220 is in turn attached to an adjusting rod 223 having an adjusting nut 224. A rod end 225 is connected to the adjusting rod 223 and fastened in cooperation with pivot arm 83. A conventional type of lost motion adjusting screw 226 is attached to the pivot arm 83 to regulate the total lost motion of rocker arm 218 during the operation of the device. The lower end of pivot arm 83 is connected to the frame piece 228 by pin 229. With the rotation of the shaft 209, the eccentric 210 rotates and strap 11 is operated to move the rocker arm 218 and thereby transmit a reciprocating motion to the pivot arm 83 which pivots about the pin 229. The pivoting of the arm 83 operates the piston rod 79 and the piston 77 to fill and discharge cheese through the right angle passageways 72.

Also mounted on the shaft 209 is a box cam 230 which is engaged by a cam follower 231 attached to the rod 106 which is mounted in bearing 232 shown in FIGURE 1. The movement of the box cam 230 operates the rocker arm 100 shown more clearly in FIGURE 4 which in turn operates the various valves included in the feeding mechanism.

In FIGURE 1, also mounted on the shaft 209, is a sprocket 234 on which is a chain 235 extending to sprocket 236 mounted on shaft 237, thereby transmitting power to the shaft 237. A sprocket 238 is mounted on shaft 237 to drive a chain 239 which extends to sprocket 240 mounted on shaft 241 of the rotor 243 forming a part of the paper dispensing device 25. As stated above, this device is well known and is described in the Patent No. 2,558,028. Generally speaking, the paper feeder includes the rotor 243 which transmits the paper to the molds from the paper chute 252.

The driving member 254 of a Geneva drive is mounted on shaft 237 and includes pins 255 positioned in the ends of the driving member 254. The driven member 257 of the Geneva drive contains slots 258 for receiving the pins 255 and is mounted on shaft 260. A sprocket 262 mounted on shaft 260 drives a chain 263 which in turn drives the sprocket 264 secured to the shaft 20. In the operation of this portion of the apparatus the conveyor 17 is moved along a predetermined path by the transmission of power through the various chain drives from the gear motor 186. The Geneva drive composed of members 254 and 257 operates to move the conveyor in a halting manner so as to advance the molds at predetermined spaced intervals, thereby bringing the molds to a halt under the paper feeder 25, filler 27, tamping device 29, and transfer mechanism 33. The paper feeder 25 is driven by the chain drive system which includes sprockets 236 and 240 and chain 239. The rotor 243 is continuously driven and due to the feeding arrangement, dividers are deposited at specified time intervals. As the molds 23 advance in a halting manner, divider material is deposited in each mold during the latter's momentary halt directly below the paper feeder. As can be seen in FIGURE 10, four lines of molds are shown. For each line of molds there must be a paper feeder; therefore, the total number necessary will depend on the number of lines of molds.

After receiving the interleaving material, the molds are advanced to the filler 27 from which quantities of hot cheese are deposited in each mold. The hot cheese is maintained in the hopper 66 in a flowable form by reason of agitator 67 and by the addition of heat, if necessary. Referring to FIGURES 3 and 4, a valve core 71 rotates in the valve housing 70. The right angle passageways 72 at one of the positions of rotation during the operation of the device becomes aligned with passageways 75 to allow the hot cheese to be drawn into the right angle passageways 72, and passageways 74 and cylinders 78. The operation is brought about by the rotation of the box cam 230 mounted on the shaft 209 (see FIG. 1). The operation of this cam rocks the arm 100 which moves the rod 109, thereby rotating the valve core 71 to bring the passageways 72 into and out of communication with passageways 73 and 75. During the operation when the passageways 72 are aligned with the passageways 75, pistons 77 are operated to draw a vacuum on the passageways 72 and thereby insure the complete filling of passageways 72 and 74 and cylinder 78 with a sufficient quantity of hot cheese. The operation of the pistons are brought about by the movement of the pivot arm 83 previously described. The drawing of the vacuum by the piston 77 coordinates with the alignment of the passageways 72 with the passageways 75.

Following this portion of the cycle, the valve core 71 is rotated 90° to align one end of the passageways 72 with the passageways 74, and the other end of the passageways 72 with the passageways 73. The rotation is again accomplished by the movement of the rod 109 through the linkage of rocker arm 100 and rod 106 associated with the box cam 230. At this point of the operation the pivot arm 83 is moved so as to complete the stroke of the piston 77, thereby placing pressure on the cheese in the passageways 72 and forcing the cheese therefrom into the passageways 73 and through the stopcock valve fittings 86 into the molds aligned directly below. The operation of the stopcock valves are such as to allow flow of the cheese therethrough when the hot cheese is discharged from the passageways 72. The positions of these valves are regulated by the movement of the rocker arm 100 transmitted through the rod 94 to rotate the rocker lever 92 and reciprocating arm 91 and thereby move the valve core arms 89. The purpose of the stopcock valve arrangement is to prevent subsequent dripping of the cheese onto the conveyor during the portion of the cycle in which the molds are advanced.

The quantities of cheese introduced into the molds may be readily varied. Due to the particular arrangement involving the lost motion adjustment 226 and the adjustable connection between piston rod 79 and pivot arm 83, exacting measurements can be obtained and varied at will. The length of the movement of piston 77 in cylinder 78 determines the amount of cheese drawn into the right angle passageways 72 and passageways 74. To vary this length of stroke the lost motion adjustment device 226 allows coarse regulation while the connection between piston rod 79 and pivot arm 83 allows fine regulation. By regulating the amount of lost motion necessary in the total movement of pin 227 before pivot arm 83 is moved, plus regulating the amount of movement of pivot arm 83 necessary to move piston rod 79, any particular quantity of cheese can be automatically dispensed. Such regulation can be readily brought about by proper adjustment of the lost motion device 226 and screw 81. Particular advantages reside in such an arrangement, as the quantities of cheese dispensed will be uniform and the dimensions of the resulting cheese slabs will also be uniform.

Upon advancement of thet molds filled with cheese from the filler 27, they are brought into contact with a pre-chilling system composed of a series of hollow cooling plates 143, previously described. Referring to FIGURE 8, it can be seen that the plates 143 are mounted on the frame member 24 in such a manner that the molds 23 pass directly over the top outer surface of the cooling plates. The inlets 151 supply coolant which flows through the plates, preferably countercurrently to the direction of movement of the molds. These plates are positioned just behind the filled 27, with relation to the direction of movement of the molds, and extend to the far end of chill tunnel 32. Normally, the temperature of the cheese deposited in the molds is within the range of 160° to 170° F. It has been found desirable to reduce this temperature to within the range of 150° to 160° F. before tamping the cheese. The cooling plates 143 are positioned on the apparatus so as to accomplish this result.

At this point of the operation each mold has had deposited therein a piece of interleaving material on which is placed a quantity of hot cheese. The molds are advanced with a halting movement as previously described, prechilled, and subsequently brought into contact with the tamping or pressure device 29. The mechanism reciprocates vertically into and out of contact with the molds during the dwell between each advance. As shown in FIGURE 1, the spring 204 urges the guide rods upwardly so as to hold the cam follower 201 into contact with the cam 200 mounted on shaft 191. As the shaft 191 rotates, the cam 200 operates the guide rods 113 to reciprocate the tamping device vertically. As shown in FIGURE 6, when a single tamping head 119 comes into contact with a single mold, the tamper housing 122 is centered within the mold by reason of the matching tapered surfaces 124 and 127. The bottom of the side walls of the tamper housing 122 abuts the shelf 128 within the mold to restrict further movement of the tamper housing into the mold and to close the mold space 126. The channel beam 114, shown in FIGURE 5, continues toward the bottom surface of the mold. Due to the close fit of the sides of the tamper 123 with the inner surfaces of the walls of the tamper housing 122, air is forced downwardly against the quantity of cheese and is allowed to escape through the breather openings 125. The bottom surface of the plunger 123 contacts the cheese and flattens it as shown in FIGURE 6. The total movement of the plunger 123 is regulated by the relative strengths of the springs 120 and 118. As an example of the relative strengths found desirable, spring 120 is preferably a 25-pound spring, while spring 118 is preferably a 75-pound spring. Springs of these strengths allow the tampers 123 to descend against the cheese while the downward movement of the tamper housings 122 are arrested by abutment with shelf 128. To ensure against damage and to allow room for additional travel in the downward movement of channel 114, the rods 115 have nuts 116 attached on the ends within the channel 114 and are held in position by springs 118. If the channel 114 moves downwardly beyond the point necessary to tamp the cheese, the downward pressure will eventually overcome the 75-pound springs 118 which will yield and allow further downward movement of channel 114 without forcing the tampers 123 downwardly to the point of causing damage. Upon the reaching of the limit of travel of the tamping mechanism and as the cam 200 rotates further, the tamping mechanism is raised from contact with the mold and the plunger 123 recedes within the housing 122 to complete the tamping cycle.

With the tamping cycle completed, the molds are advanced to the chill tunnel 32. As indicated above, the hollow cooling plates 143 extend the entire length of the chill tunnel 32. Inlets 151 near the extreme end of chill tunnel 32 receive coolant which flows through the hollow cooling plates 143 in a direction countercurrent to the direction of movement of the molds. Referring to FIGURE 7, the air which is chilled by indirect heat exchange with the coolant circulating through the hollow cooling plates 143 is circulated throughout the chill tunnel by the blower 137. The air is forced into the pressure chamber 139 through conduit 138 and escapes into the chilling chamber 141 through the small openings 140. In the chilling chamber 141 the air is thoroughly chilled by contact with the cooling plates 143 and circulates throughout the chamber 141 to substantially reduce the temperature of the cheese in the molds. The air then travels through the relatively small openings 142 into the lower chamber 133 and passes through the conduit 132 to be recycled by the blower 137. Any water or sediment is entrapped by filter 135 or can be removed from the lower chamber 133 by the drain. When necessary, the filter element in filter 135 may be replaced by removing the filter cover plate 136. The flow of chilled air across the surface of the cheese greatly aids in reducing the temperature of the cheese. However, it should be noted that the bulk of the temperature reduction is caused by the chilling action of the hollow cooling plates 143 which are positioned directly below the molds 23. The circulation of air within the chill tunnel 32 provides further insulation to the ingress of heat from the surroundings.

Following the chilling of the cheese slices, the molds are advanced into cooperation with the transfer mechanism 33. The transfer mechanism is driven by power transmitted from the gear motor 186 in FIGURE 1 through shaft 198. Referring to FIGURE 2, the shaft 198 is journaled in the bearing 270 which is supported by the vertical frame member 44. On the end of the shaft 198 is affixed a bevel gear 271, which cooperates with a second egar 272 mounted on shaft 273 journaled in the bearing 274 suitably attached to the frame. The shaft 273 has affixed thereto a sprocket 276 which operates a chain 277 which, in turn, operates a sprocket 278 mounted on a shaft 279. The shaft 279 is journaled in the bearing 280 which in turn is mounted on the horizontal frame member 282. Also mounted on shaft 279 is a box cam 283 having associated therewith a cam follower 284 attached to arm 285. The arm 285 is fixedly mounted on shaft 165. Upon rotation of the box cam 283 the arm 285 is reciprocated to supply a reciprocating movement to the shaft 165 and rod 160 which in turn moves, causing the transfer mechanism to reciprocate in a horizontal path. Referring to FIGURE 10, it can be seen that the arm 164 is duplicated inasmuch as the rods 160 are in duplicate to aid in movement of the plate 167.

Vertical movement is supplied to the transfer mechanism 33 by cam 287 mounted on shaft 279 and operating cam follower 288. The cam follower 288 is in turn attached to arm 289 which is mounted on shaft 290 journaled in the bearing 291, the latter being suitably mounted on the frame. At the other end of the arm 289 is attached a linkage 293 by reason of pin 294. The linkage 293 is attached to bar 296 through lugs 297 and pins 298. The bar 296 is connected to the vertical elevating rods 153 by nuts 300. Here again the parts described are in duplicate as shown in FIGURE 10 in order to provide smooth operation in the raising and lowering of the transfer mechanism. By the combined camming actions of the cams 283 and 287, the transfer mechanism is raised and lowered and moved in a horizontal direction in accordance with a predetermined cycle of operation.

Referring to the transfer mechanism 33 itself, the operation is carried out by the introduction of the vacuum plate housing 170 into the molds 23, following which a vacuum is impressed upon the cheese slabs, thereby momemtarily attaching them to the face 171. A vacuum is impressed upon the cheese by the operation of cam 301 mounted on shaft 279. A cam follower 302 mounted on a rocker arm 303 is operated by cam 301 to move the arm 303 about its pivot point 304 carried by the bearing 305, thereby moving a clevis 307 secured to its other end by pin 308 and attached to operating rod 309. The operating rod 309 extends into the air valve 175 to regulate the vacuum drawn through the line 177 in the well-known manner. As the cam 301 operates, a vacuum is applied to chamber 182 of the transfer mechanism to attach the cheese to the face 171 and remove it from the mold. By further operation of cam 301 the vacuum is subsequently released when the transfer mechanism 33 is moved to a position over the conveyor 49, thereby releasing the cheese slabs from the face 171 and forming stacks of interleaved cheese slabs. The total operation is carried out by the combined action of the cams 283, 287, and 301, and involves the lowering of the face 171 into a mold when the mold is aligned directly below the vacuum housing 171 and its movement by the conveyor is temporarily halted, the impression of a vacuum upon the cheese slab within the mold, the raising of the transfer mechanism with the vacuum still impressed whereby the cheese slab and associated interleaving material is withdrawn from the mold, the movement of the transfer mechanism along a horizontal path toward the belt 49 with the vacuum still impressed upon the cheese slab, the subsequent releasing of the vacuum when the transfer mechanism is positioned over the conveyor belt 49 thereby allowing the stacking of the interleaved cheese slabs, and the return of the transfer mechanism to its original position in order to allow the cycle to be repeated. In order to properly operate air valve 175 in the manner as shown and described, it is necessary to utilize some means to maintain the cam follower 302 in contact with the camming surface of cam 301. A suitable spring (not shown) is mounted in the housing of the operating rod 309. This spring urges rod 309 into the housing, thereby forcing cam follower 302 into suitable contact with the camming surface of cam 301.

Figure 12:
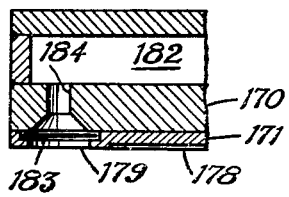
FIGURE 12 is a sectional view taken along line 12—12 of FIGURE 11.

In referring to FIGURES 11 and 12, the vacuum plate housing includes the vacuum chamber 182 upon which is impressed a vacuum through the hollow rods 169, flexible tubes 173, and vacuum line 174. As a result, suction is created at the screened openings 179 upon the surface of the plate 171. The top surface of the cheese slab is drawn against the plate 171 and held there by the force of the vacuum. The screens 183 prevent the cheese from being drawn into the pasasgeways 184. The recessed portion 178 forms a trap for air which can subsequently be put to use in aiding in the release of the cheese slab from the vacuum plate. The divider material exhibits a tendency to adhere slightly to the cheese and is therefore lifted from the mold with the cheese. To further expedite the removal of the cheese slab and associated divider from the mold, breather openings 130 are provided in the bottom of each mold. The openings allow air to enter the mold during the removal to alleviate the formation of a vacuum. The openings are preferably of a size of 1/16 of an inch in diameter.

A retaining bar 180 further aids in the operation of removing the cheese slabs fromt he molds. The bar 180 is flat and is positioned in such a manner as to sufficiently overlap a portion of each mold during the removal of the cheese. The molds are detachable from the conveyor and the retaining bar 180 holds the molds in the conveyor.

The stacking conveyor belt 49 is operated by the gear motor 58 as previously described. As it is desirable to stack the cheese on the conveyor belt 49, utilizing, for example, 8 cheese slabs to a stack, it is desirable to have the conveyor operate only periodically. As a result, a suitable driving arrangement is provided which can be seen in FIGURE 10. In this figure, sprocket 311 is mounted on shaft 279 and is operated by the rotation of the shaft. Chain 312 extends from sprocket 311 to a second sprocket 313 which is mounted on shaft 165. The sprocket 313 is freely mounted on the shaft 165 so as to be capable of continuous rotation while the shaft itself rotates to a limited degree only in moving rocker arms 164 in the manner previously described. The sprocket 313 includes a cam 314 which operates a normally open switch 315 wired in series with motor 58 and a suitable source of electric power. This switch can be located in FIGURES 2 and 10. The switch operates the gear motor 58 in accordance with the length of time required for the camming surface 314 to be rotated about the shaft 165. As shown, the stacking conveyor belt 49 is operated following the depositing of 8 cheese slabs in a stack. Each finished stack is moved forward by the belt to present a clear space for the formation of a new stack. To accomplish this, the cam 314 operates the switch for a relatively short length of time to allow adequate advancement of the cheese stack and then immediately cuts off the switch so as to stop any further movement of the stacking conveyor.

As shown in FIGURES 8 and 9, the molds 23 are detachable from the conveyor 17. The molds are held in place on the conveyor by fingers 148, spring clips 149, and the detent locking arrangement 132. The purpose of utilizing removable molds is to facilitate the cleaning of the molds without hindering the continuous operation of the apparatus. As the molds are removable, it has been found desirable to utilize a mold support 40 shown in FIGURES 1 and 2. This support provides a surface capable of maintaining the molds in close association with the conveyor during the return run of the conveyor, thereby overcoming the possibility of the molds dropping from the conveyor by reason of their own weight.

The sprockets 41 are utilized to keep the conveyor chain taut throughout the operation so as to reduce the wear occasioned by the movement of the molds along the surface of the mold support and to aid in the efficiency of the operation. The hollow cooling plates 143 extend from the filler 27 to the end of chill tunnel 32 as illustrated in the accompanying drawings. Precooling the molds prior to the filling operation may be carried out to increase the efficiency of the tamping operation and reduce the tendency of the cheese to adhere to the tamper 123, if desired. The temperature of the cooling plates 143 in the chill tunnel 32 is maintained within the approximate range of −5° to −10° F. The temperature of the cooling plates 143 between the filler 27 and the chill tunnel 32 is preferably maintained between 0° and 25° F. It is preferable to tamp the chilled cheese approximately 15 seconds after the cheese is deposited in the molds when operating under the preferred temperature conditions. However, tamping can be carried out after 45 seconds if necessary. The breather openings 125 in the tamper housing 123 are preferably 1/32 of an inch in diameter and these holes are placed 3/32 of an inch above the bottom of the housing.

As the cheese is chilled, it shrinks away from the sides of the mold and, as a result, can be readily removed therefrom. The divider material utilized is preferably 1/8 of an inch shorter in each dimension than the dimensions of the molding space 126. A suitable tab may be supplied to the divider material, if desired, to facilitate subsequent separation of the material from the cheese. As can be seen in FIGURE 6, the inner edge of the bottom surface of tamper housing 122 overlaps the molding space 126. Upon withdrawal of the tamper 123 out of contact with the cheese the tamper housing remains in contact with the shelf 128 and the overlapping portion holds the slab in the molding space 126 until the tamper 123 is completely out of contact with the slab surface.

The filler 27 contains passageways 72, 73, 74, and 75, which are preferably 1¼ inches in diameter. Such a size allows the filler to handle cheese of various viscosities. For example, cheese food, which is very fluid, can be handled as well as comparatively viscous process cheese. To reduce friction, the filling action is accomplished by utilizing approximately 25% flow by gravity and 75% flow by the action of the piston. The small diameter of cylinder 78 and long stroke of piston 77 affords a more sensitive control. The piston 77 should be close fitting and is preferably made from solid Teflon.

The molds utilized may contain molding spaces of any desired shape. For example, rectangular cheese slabs are normally made commercially but it should be pointed out that circular or polygonal shapes may be used.

Obviously, many modifications and variations of the invention as hereinbefore set forth may be made without departing from the spirit and scope thereof, and therefore only such limitations should be imposed as are indicated in the appended claims.

We claim:

1. A method of forming groups of interleaved slabs made from plastic material, said method comprising separately depositing measured quantities of heated partially fluid plastic material on interleaving material, partially cooling said plastic material, molding each of said measured quantities of plastic material into a slab of predetermined size, chilling said slabs, and thereafter grouping said slabs with said interleaving material intermediate each pair of slabs.

2. A method of forming stacks of cheese slabs having single sheets of divider material intermediate each slab, said method comprising separately depositing measured quantities of heated cheese on single sheets of divider material, partially cooling said cheese, molding each of said measured quantities of cheese into a slab while still partially hot and while still positioned on said divider material, further chilling said slabs to set up said cheese on said divider material, and thereafter forming groups of said cheese slabs with said divider material intermediate each adjacent slab.

3. A method of forming a stack of slabs of food product having dividers intermediate each slab, said method comprising depositing a measured quantity of flowable plastic product on said dividers, confining the bottom of said dividers and the sides of said plastic product to a space of predetermined size, applying pressure to said product across the top thereof and at the same time permitting air to escape from said space to cause said product to flow into all portions of said space, solidifying said product on said dividers to form slabs of product of predetermined size, removing said confinement from said slabs, and forming a group of said slabs with said dividers across one face thereof and intermediate said face and the opposite face of the adjacent slab.

4. A method of forming a stack of slabs of process cheese having dividers intermediate each slab, said method comprising depositing measured quantities of heated cheese on said dividers, confining the bottom of said dividers and the four sides of said cheese on said dividers to a space of predetermined size, partially chilling said cheese, applying pressure to said cheese across the top thereof and at the same time permitting the air to escape from said space to cause said cheese to flow into all portions of said confined space, further chilling said cheese to set up said cheese on said dividers into slabs of predetermined size, removing said confinement from said slabs, and forming a group of said slabs with said dividers across one face of each slab and intermediate said face and the opposite face of the adjacent slab.

5. A method of forming a stack of interleaved slabs of process cheese or the like, said method comprising maintaining an amount of said cheese in a flowable condition at about 160–170° F., positioning dividers to receive said cheese, depositing measured quantities of said flowable cheese upon said dividers, confining the cheese to a space above the area of said dividers, reducing the temperature of the cheese to about 150–160° F., applying pressure upon the cheese across the upper surface opposite the dividers in a manner to provide distribution of the cheese to all portions of said space, chilling the pressed cheese an amount to substantially set up said cheese into slabs, and transferring the slabs of cheese and the dividers to a point to form a stack thereof with a divider between successive slabs.

References Cited in the file of this patent

UNITED STATES PATENTS

| | | |
|---|---|---|
| 2,012,529 | Eldrege | Aug. 27, 1935 |
| 2,018,637 | Doane | Oct. 22, 1935 |
| 2,246,016 | Sinclair | June 17, 1941 |
| 2,352,210 | Kraft | June 27, 1944 |
| 2,520,183 | Toone | Aug. 29, 1950 |
| 2,635,965 | Hensgen et al. | Apr. 21, 1953 |
| 2,657,993 | Arkin | Nov. 3, 1953 |
| 2,667,420 | Meulemans et al. | Jan. 26, 1954 |
| 2,799,586 | Hensgen et al. | July 16, 1957 |